Patented Sept. 9, 1941

2,255,729

UNITED STATES PATENT OFFICE 2,255,729

PURIFICATION OF VINYL AROMATIC RESINS

Edgar C. Britton and Walter J. Le Fevre, Midland, Mich., assignors to The Dow Chemical Company, Midland, Mich., a corporation of Michigan No Drawing. Application November 16, 1939, Serial No. 304,696

8 Claims. (Cl. 260—91)

This invention concerns an improved method of purifying vinyl aromatic resins. It particularly concerns the removal of volatile ingredients and low molecular weight polymers from such resins.

The term "vinyl aromatic resin" as employed herein refers generically to the solid polymers of vinyl aromatic compounds, such as styrene, para-chloro styrene, meta-chloro styrene, ortho-chloro styrene, para-methyl styrene, meta-methyl styrene, ortho-methyl styrene, para-ethyl styrene, ortho-ethyl styrene, para-isopropyl styrene, ortho-para-di-ethyl styrene, vinyl naphthalene, etc., and the solid resinous co-polymers of such compounds with other unsaturated organic compounds, such as divinyl benzene, di-allyl maleate, etc.

Such resins, as ordinarily prepared, are a mixture of polymers or co-polymers of varying molecular weight having a small, but appreciable, proportion of volatile ingredients such as the unpolymerized vinyl aromatic compound and other aromatic hydrocarbons dissolved therewith. Freshly prepared polystyrene, for example, usually contains polymers of varying molecular weight and also contains from 1 to 10 per cent by weight of unpolymerized styrene and other volatile ingredients, such as ethylbenzene, benzene, etc., which frequently are present as impurities in the styrene used to make the polymer. In order to obtain products of uniformly good quality, it is desirable that the volatile ingredients be removed from the resins as completely as possible, since the proportion of such volatiles in the crude resin may vary considerably from one batch to another and the presence of the volatiles modifies the physical and dielectric properties of the resins and may cause them to blush on standing. It frequently is also desirable to remove from the resins the lower molecular weight polymers or co-polymers and thus to raise the average molecular weight of the resin. It is known that solid polystyrene varies from a brittle substance to a tough maleable substance as its molecular weight is increased.

The desirability of removing the volatile ingredients from polystyrene has long been recognized and two general methods for the removal of such ingredients are known. One known method involves vaporizing the volatile ingredients from the polymer under vacuum or with steam. This method, although effective in removing the major portion of the volatile impurities, is expensive and tedious to carry out. It is very difficult to reduce the volatile content of polystyrene to below 0.5 per cent by this method. The other known method involves dissolving the impure polymer in a solvent, such as benzene or toluene, precipitating the polymer by mixing the solution with ethyl alcohol and then removing and drying the precipitated polymer. This latter method involves a number of disadvantages. It requires the use of large quantities of expensive organic liquids and extra steps for the separation of the liquids from one another in condition suitable for re-employment. Also, during such practice the polymer is usually precipitated either as a web of fine filament which is inconvenient to handle, or as an only partially purified stringy, gummy mass. Neither of these known methods provides for the removal of low molecular weight polymers from the resins.

We have discovered that, whereas methanol, ethanol, and propanol are non-solvents for vinyl aromatic resins, higher alcohols, such as the butanols, pentanols, hexanols, heptanols, etc., have the property of penetrating into and swelling such resins and of extracting the volatile ingredients and the lower molecular weight polymers usually present in the resins. We have further found that the volatile ingredients present in the impure resins vaporize together with the butanol or higher alcohol during evaporation of the latter from a resin treated therewith. Such treatment with butanol or a higher alcohol capable of swelling the resin permits more rapid and complete removal of the volatile ingredients of the resin than is obtained by usual vacuum drying methods.

In practicing the invention, a vinyl aromatic resin preferably in a granular or powdered form, is treated with sufficient butanol or higher aliphatic alcohol to swell and impregnate the resin therewith, or with an excess of alcohol over the amount required to cause swelling, when it is desired to extract the lower molecular weight polymers and other impurities from the resin. The treatment is preferably carried out with stirring at an elevated temperature, e. g. between 50° C. and the boiling temperature of the alcohol, so as to hasten penetration of the alcohol into the resin, but it may be carried out at lower temperatures, e. g. room temperature, and without stirring if desired.

When an excess of alcohol has been employed and it is desired to extract low molecular weight polymers from the resin, the excess alcohol is decanted or filtered from the swollen resin. If desired, the latter may be further treated with alcohol to render the extraction more complete.

The residual gel of resin and alcohol is then heated, preferably under vacuum at temperatures between 50° and 150° C., to vaporize the alcohol and recover the resin in purified form.

As a procedure alternative to that just described, the impure resin may be dissolved in a solvent, such as benzene, toluene, xylene, or chlorobenzene, etc., and then be precipitated by mixing the solution with the butanol or higher alcohol. The volatile ingredients and the lower molecular weight polymers initially present in the resin remain in solution and only the higher molecular weight polymers or co-polymers are precipitated as a gel with the alcohol. The gel is then separated from the liquor and occluded liquor is vaporized therefrom to recover the purified resin.

Another alternative procedure for removing low molecular weight polymers or co-polymers from a vinyl aromatic resin is to swell the resin with a butanol or higher alcohol as hereinbefore described and then to digest or scrub the resultant gel with a solvent for the resin, e. g. benzene, toluene, xylene, ortho-dichlorobenzene, ethylene chloride or propylene chloride, etc. If desired, a mixture of the alcohol and the resin-solvent may be used in the swelling operation as well as in the scrubbing operation. In carrying out these operations care should, of course, be taken not to employ sufficient solvent to completely dissolve the polymer. By suitable proportioning of the alcohol and resin solvent employed in the operation, the lower molecular weight polymers may sufficiently be extracted leaving a gel comprising only the polymers of very high molecular weight. The residual gel is then separated from the liquor and occluded liquor is vaporized from the gel.

When the volatile ingredients only are to be removed from an impure vinyl aromatic resin, the extraction operations are omitted. In such case the resin is swelled to a gel by treatment with the butanol or higher alcohol, after which the alcohol, together with the undesirable volatile ingredients of the resin, are vaporized off to leave the purified resin in a form retaining all of the solid polymers of which it was initially composed.

The following examples illustrate several ways in which the principle of the invention has been applied and demonstrate certain of its advantages, but they are not to be construed as limiting the invention.

EXAMPLE 1

A sample of granular polystyrene, containing 3.3 per cent by weight of styrene and other volatile ingredients, was devolatilized by heating the same under vacuum at a temperature of 100°–105° C. for 7 hours, the schedule of absolute pressures under which the material was maintained during the heating being as follows:

1.5 hours at a pressure of 2 inches of mercury
1 hour at a pressure of 0.7 inch of mercury
4 hours at a pressure of 1.5 inches of mercury
0.5 hour at a pressure of 0.5 inch of mercury The polymer, which had during heating congealed to a porous mass, was then granulated and molded at a temperature of 150° C. into test pieces having the dimensions 0.1 inch x 1.75 inches x 2.5 inches. Another sample of the granular polystyrene (one part by weight) was dissolved in approximately 4 parts of benzene and then precipitated as a gel by adding 3 parts of normal butyl alcohol to the solution with stirring. The liquor was decanted from the gel, after which the latter was devolatilized by heating the same at a temperature of 100°–105° C. for 7 hours while varying the pressure in accordance with the above stated schedule. The residual polymer was granulated and then molded at a temperature of 150° C. into test pieces having the dimensions given above. The tensile strength in pounds per square inch cross section; the impact strength in inch-pounds of energy applied by a blow to cause breakage; the Shore Scleroscope hardness; the heat distortion in degrees centigrade; the dielectric constant; and the electric power factor of the molded pieces were then determined in the usual ways. It may be mentioned that, except for the size of the test pieces, the methods used in determining the impact strength and the heat distortion are similar to those described in A. S. T. M. D256-34T and A. S. T. M. D48-33, respectively. The following table states the method used in removing volatile ingredients from the polystyrene and gives the properties of the molded test pieces. In the table, the devolatilization method which consisted in merely heating the granular polymer under vacuum is referred to as "vacuum drying" whereas the devolatilization method which involved precipitating the polymer from a solution thereof by treatment with butyl alcohol and subsequent heating of the precipitated polymer gel under vacuum is referred to as "butanol treatment."

*Table I*

| Run No. | Devolatilization method | Properties of molded polymers | | | | | |
|---|---|---|---|---|---|---|---|
| | | Tensile strength | Impact strength | Shore hardness | Heat distortion | Dielectric constant | Power factor |
| | | *Lbs./sq. in.* | *In.-lbs.* | | *° C.* | | *Percent* |
| 1 | Vacuum drying | 7,900 | 1.1 | 81 | 88 | 2.38 | 0.019 |
| 2 | Butanol treatment | 9,000 | 1.8 | 84 | 88 | 2.50 | 0.027 |

EXAMPLE 2

A resin prepared by co-polymerizing 99 parts by weight of styrene with 1 part of allyl cinnamate was granulated. One sample of the granular co-polymer was devolatilized by heating the same under vacuum employing the same conditions of temperature, absolute pressures and time of heating as were employed in Example 1. The loss in weight of the sample due to the devolatilization corresponded to 1 per cent of its original weight. Another sample of the granular co-polymer (100 grams) was devolatilized by heating it with 200 grams of normal butyl alcohol on a steam bath for 1 hour, whereby the co-polymer was swelled to a gel. About 85 grams of the butyl alcohol was distilled off and the distillate was found to contain 1.86 grams of styrene. The undistilled alcohol was decanted from the polymer and the latter was heated under reflux for 45 minutes with two separate 100 gram portions of fresh normal butyl alcohol, the alcohol being decanted from the polymer after each treatment. The residual gel of polymer and alcohol was then devolatilized by heating the same under vacuum at the temperatures and pressures given in Example 1. The devolatilized polymer weighed 97.5 grams, i. e. the loss in weight due to the purification treatments corresponded to 2.5 per cent of the original weight of the polymer. Separate samples of the polymer which had been devolatilized by heating under vacuum were molded at temperatures of 150° C. and 170° C., respectively, into test pieces having the dimensions given in Example 1, and samples of the polymer which had been devolatilized by the treatment with normal butyl alcohol followed by vacuum drying were molded at the same respective temperatures into test pieces of similar size and shape. The properties of the test pieces were determined as in Example 1 (except that the hardness was measured as Rockwell superficial hardness rather than as Shore Scleroscope hardness) and are given in Table II. In the table the test pieces are identified by statement of the purification, or devolatilization, method employed and of the temperature at which the devolatilized polymer was molded to form each test piece. As in Example 1 devolatilization by mere heating of the polymer under vacuum is referred to as "vacuum drying," whereas purification in accordance with the invention by first treating the impure polymer with normal butyl alcohol and thereafter heating it under vacuum is referred to as "butanol treatment."

completing the extraction each resin sample was heated under vacuum as specified in Example 1, to evaporate the alcohol and other volatile ingredients therefrom. The samples were then weighed. Table III states the purification treatment to which each sample was subjected and indicates the extent to which impurities were removed by giving the loss in weight of the resin due to the purification in terms of per cent of the original weight of the resin sample. As in the preceding examples, purification by mere heating of the polymer under vacuum is referred to in the table as "vacuum drying," whereas purification by first treating the resin with an alcohol and thereafter heating it under vacuum is referred to as an alcohol treatment, e. g., "ethanol treatment."

*Table III*

| Run No. | Purification method | Impurity removal percent of original weight of resin |
|---|---|---|
| 1 | Vacuum drying | 3 |
| 2 | Ethanol treatment | 2.5 |
| 3 | Isopropanol treatment | 2.5 |
| 4 | n-Butanol treatment | 4.0 |
| 5 | sec-Butanol treatment | 4.0 |
| 6 | n-Hexanol treatment | 6.9 |

*Table II*

| Run No. | Devolatilization method | Properties of molded resin | | | | | |
|---|---|---|---|---|---|---|---|
| | | Molding temp. | Tensile strength | Impact strength | Rockwell superficial hardness | Heat distortion | Power factor |
| | | °C. | Lb./sq. in. | In.-lbs. | | °C. | Per cent |
| 1 | Vacuum drying | 150 | 8,400 | 1.0 | 15x—90 | 87 | 0.040 |
| 2 | Butanol treatment | 150 | 8,500 | 2.0 | 15x—88 | 87 | 0.014 |
| 3 | Vacuum drying | 170 | 7,300 | 0.8 | 15x—90 | 86 | 0.046 |
| 4 | Butanol treatment | 170 | 7,800 | 1.6 | 15x—90 | 91 | 0.014 |

EXAMPLE 3

The purpose of this example is to present a comparison between different alcohols as regards their effectiveness in removing impurities from a vinyl aromatic resin. The resin employed was a granular co-polymer of a styrene with 2 per cent by weight of allyl cinnamate. One sample of this resin was heated under vacuum as described in Example 1, to vaporize its volatile ingredients therefrom. It was weighed before and after the heating operation so as to measure the loss in weight due to vaporization. Other weighed samples of the resin were subjected to repeated extractions with the respective alcohols: ethyl alcohol, isopropyl alcohol, normal butyl alcohol, secondary butyl alcohol and normal hexyl alcohol. Each extraction was carried out by heating the resin and alcohol under reflux and then filtering the alcohol from the resin. During these extraction operations it was noted that ethyl alcohol and isopropyl alcohol do not dissolve or swell the polymer to appreciable extent, but that each of the other alcohols penetrate into and swell the resin and that they extract lower molecular weight polymers from the resin. For instance, the extract obtained when using normal hexyl alcohol was cooled, whereby a polymer having a molecular weight of approximately 14,000 was precipitated in amount corresponding to 4 per cent of the weight of the resin subjected to the extraction. After From the above Table III it will be seen that the treatments with ethyl alcohol and with isopropyl alcohol retarded the removal of undesirable ingredients from the resin below the amount removed by vacuum drying alone, but that the treatments with higher alcohols increased very markedly the extent of impurities removal. The beneficial action of the butanols and other higher alcohols appears to be due to their properties of penetrating into and swelling the solid resin, of selectively dissolving low molecular weight polymers in the resin, and of forming low boiling azeotropes with the volatile ingredients usually present in such resin. As hereinbefore pointed out, these properties are not shared to appreciable extent by methyl alcohol, ethyl alcohol, or isopropyl alcohol.

EXAMPLE 4

A 100 gram sample of the co-polymer of styrene and allyl cinnamate described in Example 3 was heated on a steam bath for 1 hour with 200 grams of normal butyl alcohol. The temperature was then raised and 60 grams of liquor was distilled from the mixture. The distillate was a solution of 1.22 grams of monomeric styrene in normal butyl alcohol. The residue from the distillation, which was a swollen mass of the polymer in the alcohol was washed with 100 grams of hot butyl alcohol and filtered. The filtrate upon cooling precipitated a polymer (apparently polystyrene) of relatively low molecular weight.

The washed resin was subjected to steam distillation to remove residual alcohol and any other volatile ingredients therefrom, after which it was dried by heating under vacuum and weighed. Its weight was 94.5 grams, indicating that 5.5 grams of volatile ingredients and low molecular weight polymers had been removed by the purification treatment.

Other alcohols higher than propyl alcohol which may be employed in practicing the invention are tertiary butyl alcohol, normal amyl alcohol, iso-amyl alcohol, secondary amyl alcohol, tertiary amyl alcohol, any of the isomeric hexanols, cyclohexyl alcohol, any of the isomeric heptanols, etc. In general any monohydric alcohol which is liquid at room temperature and which contains more than 3 carbon atoms in its molecule may satisfactorily be used.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. The method of removing undesirable ingredients from a vinyl aromatic resin which comprises treating the resin with a liquid monohydric aliphatic alcohol containing more than 3 carbon atoms in its molecule to form a swollen mass of the resin and thereafter removing the alcohol from the resin.

2. The method of removing volatile impurities from a vinyl aromatic resin which comprises treating the resin with a liquid monohydric aliphatic alcohol containing more than 3 carbon atoms in its molecule to form a swollen mass of the resin and, thereafter vaporizing the alcohol from the resin, whereby the volatile impurities are evaporated and removed from the resin along with the alcohol.

3. The method of removing polymers of relatively low molecular weight from a vinyl aromatic resin which comprises treating the resin with a liquid monohydric aliphatic alcohol containing more than 3 carbon atoms in the molecule to form a swollen mass of the resin, and extracting the lower molecular weight polymers from the mass with the alcohol.

4. The method of removing undesirable ingredients from a vinyl aromatic resin which comprises treating the resin with a liquid monohydric aliphatic alcohol containing more than 3 carbon atoms in its molecule to form a swollen mass of the resin, extracting a lower molecular weight polymer from the swollen resin with an excess of the alcohol, and thereafter heating the swollen resin under vacuum to evaporate the alcohol and other volatile ingredients therefrom.

5. The method of removing undesirable ingredients from a vinyl aromatic resin which comprises dissolving the resin in a solvent, thereafter precipitating the resin by admixing the resultant solution with a liquid monohydric aliphatic alcohol containing more than 3 carbon atoms in its molecule, separating the precipitated resin from the liquid and evaporating residual alcohol from the resin.

6. The method of removing undesirable ingredients from polystyrene which comprises treating the polystyrene with a liquid monohydric aliphatic alcohol containing more than 3 carbon atoms in its molecule and heated to a temperature above 50° C., whereby a swollen mass of the polystyrene and alcohol is formed and thereafter removing the alcohol from the polystyrene.

7. The method of removing the polymers of relatively low molecular weight from solid polystyrene which comprises extracting the latter with a liquid monohydric aliphatic alcohol containing more than 3 carbon atoms in its molecule while maintaining the alcohol at an elevated temperature above 50° C.

8. The method of removing volatile impurities from polystyrene which comprises treating the polystyrene with a liquid monohydric aliphatic alcohol containing more than 3 carbon atoms in its molecule to form a swollen mass of the polystyrene and alcohol and thereafter heating the mass under vacuum to evaporate the alcohol and other volatile ingredients from the polystyrene.

EDGAR C. BRITTON.
WALTER J. LE FEVRE.